(12) United States Patent
Abraham et al.

(10) Patent No.: US 8,973,158 B2
(45) Date of Patent: Mar. 3, 2015

(54) TRUST LEVEL ACTIVATION

(75) Inventors: Saji Abraham, Kirkland, WA (US);
Hart Wilson, Auburn, WA (US);
Tassaduq Basu, Redmond, WA (US);
Sermet Iskin, Bellevue, WA (US);
Liang Zhao, Bothell, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 164 days.

(21) Appl. No.: 13/186,474

(22) Filed: Jul. 20, 2011

(65) Prior Publication Data

US 2013/0024929 A1  Jan. 24, 2013

(51) Int. Cl.
*H04L 29/06* (2006.01)
*G06F 21/53* (2013.01)

(52) U.S. Cl.
CPC ...................................... *G06F 21/53* (2013.01)
USPC ........................................................... 726/29

(58) Field of Classification Search
CPC .......... G06F 21/53; G06F 21/50; G06F 21/52
USPC ........................... 726/22, 26, 27, 30; 713/189
See application file for complete search history.

(56) References Cited

U.S. PATENT DOCUMENTS

| | | | |
|---|---|---|---|
| 6,167,522 A | 12/2000 | Lee et al. | |
| 6,275,938 B1 | 8/2001 | Bond et al. | |
| 6,691,230 B1 | 2/2004 | Bardon | |
| 7,103,625 B1 * | 9/2006 | Hipp et al. | 709/201 |
| 2005/0149726 A1 * | 7/2005 | Joshi et al. | 713/164 |
| 2006/0047922 A1 | 3/2006 | Johnson et al. | |
| 2006/0190606 A1 * | 8/2006 | Kohavi | 709/226 |
| 2007/0260577 A1 | 11/2007 | Bernabeu-Auban et al. | |
| 2010/0138639 A1 | 6/2010 | Shah et al. | |
| 2010/0199357 A1 | 8/2010 | Hoffman et al. | |
| 2010/0332760 A1 | 12/2010 | McKeen et al. | |
| 2011/0047613 A1 | 2/2011 | Walsh | |

FOREIGN PATENT DOCUMENTS

CN        1678968 A        10/2005

OTHER PUBLICATIONS

"international Search Report", Mailed Date: Nov. 28, 2012, Application No. PCT/US2012/045998, Filed Date: Jul. 10, 2012, pp. 9.
Clifford, et al., "The Solar Trust Model: Authentication without Limitation", Retrieved at <<http://ieeexplore.ieee.org/ stamp/stamp.jsp?tp=&arnumber=738650>>, Dec. 7-11, 1998, pp. 8.

(Continued)

*Primary Examiner* — Edward Zee
(74) *Attorney, Agent, or Firm* — Timothy Churna; Kate Drakos; Micky Minhas

(57) ABSTRACT

An isolation execution environment provides an application with limited resources to execute an application. The application may require access to secured resources associated with a particular trust level that are outside of the isolation execution environment. A trust activation engine determines the trust level associated with a request for a resource and operates differently based on the trust level. A broker process may be used to execute components providing access to resources having a partial trust level in an execution environment that is separate from the isolation execution environment.

20 Claims, 7 Drawing Sheets

130

(56) References Cited

OTHER PUBLICATIONS

"Sandbox", Retrieved at <<http://dev.chromium.org/developers/design-documents/sandbox>>, Retrieved Date: Apr. 28, 2011, pp. 8.
"Oracle Security Products and Features", Retrieved at <<http://www.stanford.edu/dept/itss/docs/oracle/10g/network.101/b10777/galsyste.htm>>, Retrieved Date: Apr. 28, 2011, pp. 45.
Arslan, Anthony, "Accessing Shared Resources Using ASP.NET", Retrieved at <<http://www.15seconds.com/issue/030926.htm>>, Retrieved Date: Apr. 28, 2011, pp. 7.
"Office Action Issued in Chinese Patent Application No. 201280035888.1", Mailed Date: Aug. 7, 2014, 10 Pages.

* cited by examiner

250

TRUST LEVEL ACTIVATION

BACKGROUND

The proliferation of network computing has enabled users to acquire code from various sources ranging from trusted systems to unknown sources. The code can be downloaded from the Internet, contained in documents, or attached to an email. The code may contain bugs or vulnerabilities that can be exploited by malicious code that may access resources protected from a user. The execution of such code may damage a computer system and/or result in obtaining a user's sensitive and private data.

An isolation execution environment is one type of code security mechanism that attempts to address the security concerns with acquiring code from unknown or untrusted sources. An isolation execution environment executes code within an environment that has restrictions to prohibit the code from accessing resources outside of the isolation execution environment. In this manner, the code cannot compromise the host system. However, such restrictions do not offer any flexibility in allowing the application to utilize resources outside of the isolation execution environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An isolation execution environment may be used to execute applications in order to prevent the application from unintentionally or maliciously affecting other executing applications or resources and from leaking sensitive data. The isolation is facilitated by controlling the resources that are accessible to the application in the isolation execution environment. A component, such as an application programming interface (API), may be used to access the resource and is associated with a trust level that reflects the level of security associated with the resource.

A trust activation engine determines whether or not a low-privilege application may execute the API associated with a resource and under what conditions. A base trust component may be executed in the isolation execution environment of the low-privilege application. A full trust component may never be executed directly by the low-privilege application. For a partial trust component, the trust activation engine activates a broker process, separate from the isolation execution environment, to execute the partial trust component. In this manner, the low-privilege application is shielded from the methods of the API used to access the resource yet obtains the benefits of accessing the resource associated with the partial trust component.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
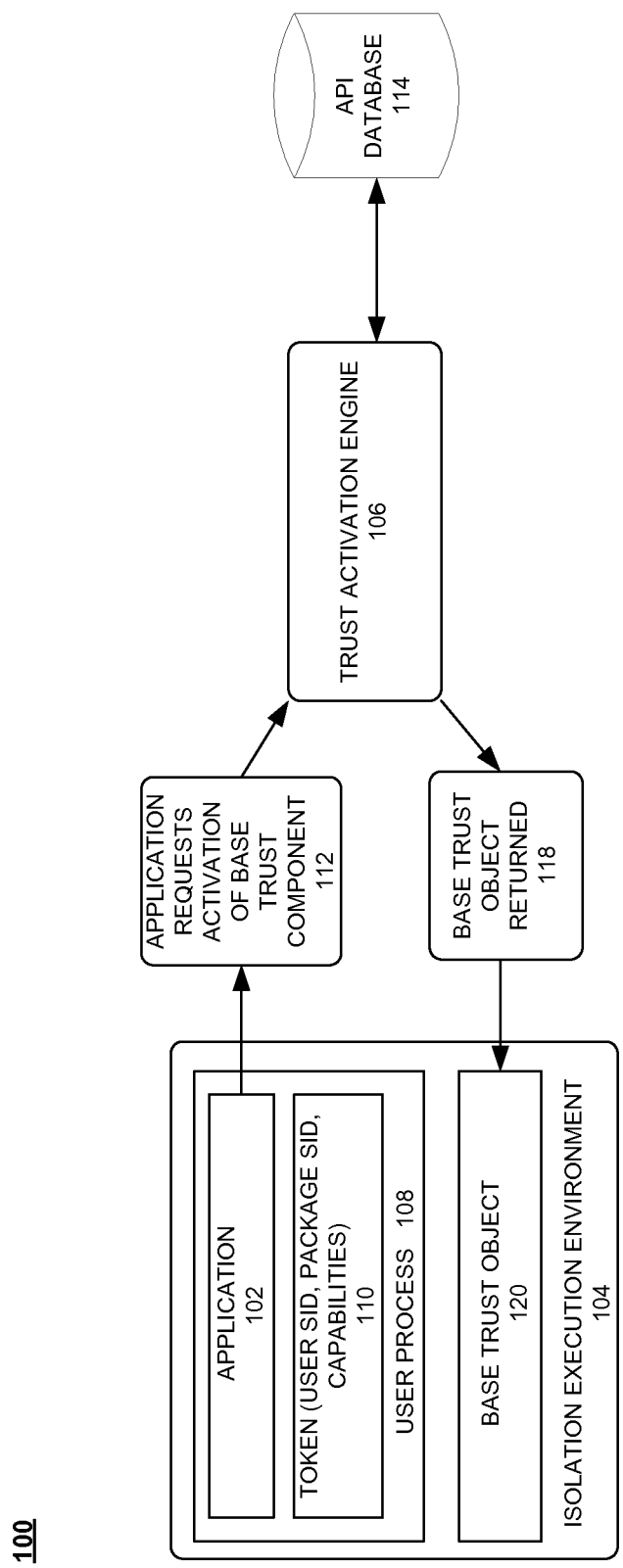
FIG. 1 illustrates a block diagram of a first exemplary system for trust level activation.

Various embodiments are directed to a technology that extends the reach of application code executing in an isolated execution environment to operating system runtime components. An isolation execution environment may be used to execute applications in order to prevent the application from unintentionally or maliciously affecting other executing applications or resources and from leaking sensitive data. The isolation is facilitated by controlling the resources that are accessible to an application. The resources are categorized by a trust level that denotes the security level of the resource. The applications are categorized by a privilege level that denotes the application's security level to access resources. A high-privilege application may access all resources and a low-privilege application may access certain trust level resources under varying conditions. The technology described herein permits a low-privilege application to access certain operating system runtime components in a manner that minimizes risks to a user's sensitive data and computing environment.

In an embodiment, an application may be downloaded from a server, such as an application store. The downloaded application may be in the form of a package that contains application code and a manifest file. The application code may be any type of computer-executable instructions such as, without limitation, program modules, application software, video games, enterprise software, software component, and so forth. The manifest file may include the application's identity (e.g., publisher, the application's name, version of the application), a targeted architecture for the application (e.g., processor architecture, operating system version, etc.), dependencies (e.g., hardware device and/or other applications), capabilities, and so forth. The capabilities section identifies the resources that the application requires to operate. Some of the capabilities may refer to resources that are not accessible from within an isolated execution environment.

A resource may be a device or a functionality that represents a risk to a user's security or privacy and as such, is controlled by the operating system. A device may be a hardware device located on the user's computing device posing a security risk to the user. Examples of such devices may be a webcam, an onboard cellular chip, a microphone, a GPS receiver, and so on. Examples of functionalities may be read or write access to a user's photo library, outbound access to the Internet and networks in public places, inbound access to the user's home network, and so on.

For example, an application may require access to a user's photo library. Normally, the location of the user's photo library would not be accessible to an application running in an isolated execution environment. The capability section of the manifest file would indicate that the application requires use of the user's photo library. The user implicitly consents to the application's access to the user's photo library when the user downloads the application's package after reviewing the manifest file. However, when the application runs in the isolation execution environment, the application will need access to the user's photo library.

In one or more embodiments, a resource may be accessed through a software component, such as an application programming interface (API). For example, a resource may be a file system, disk I/O, network I/O, and so forth. The application requests access to the resource through an API call. For example, an API call may allow a read operation performed on a database, allow access to a file system, allow access a network, and so forth. The processing of the API call differs based on the trust level associated with the API.

In one or more embodiments, each application may be categorized into one of two privilege levels: a high privilege application or a low privilege application. A high privilege application has access to all the operating system runtime components and a low privilege application has direct access to only certain operating system runtime components. The components may be categorized into three trust levels: a base trust; a partial trust; and a full trust. A base trust component may be accessible to an application associated with any privilege level. A full trust component may only be directly accessible to high privilege applications. A partial trust component may be accessed by low privilege application through a broker process.

A broker process operates in a separate execution environment from the isolation execution environment and is configured to execute the API calls, requested from a low-privilege application, for partial trust components. A partial trust component requires a higher level of code security than a base trust component and has a lower code security level than a full trust component. By using the broker process as an intermediary between the application and the operating system, the integrity of the resource is secure from damage caused by malicious code that may be present in the application. Attention now turns to a more detailed description of embodiments of a system embodying the technology that extends an isolation execution environment to activate trust level components.

Referring to FIG. 1, there is shown an exemplary system 100 configured to enable a low-privilege application 102 to access base trust components within an isolation execution environment 104. The system 100 may be performed on any type of computing device, such as, handheld, portable, servers, computers, mobile phones, personal assistant devices, and so forth.

The system 100 has an isolation execution environment 104 and a trust activation engine 106. The isolation execution environment 104 may be configured to execute a low-privilege application 102 in a user process 108. The user process 108 may be associated with a token 110 that identifies the application 102 running in the user process 108 and the permissions or capabilities that the application 102 is permitted to access. The token 110 may include a user secure identifier (SID), a package SID, and the capabilities of the application. The user SID identifies the user process and the package SID identifies the application. The capabilities are the user-permitted accesses to resources that the application 102 requires.

Initially, an application 102 registers with the operating system when the application 102 is installed into the system 100. A user process 108 may be created for the application 102 and a token 110 may be associated with the user process 108. As the application 102 executes, the application 102 may request activation of a base trust component (block 112). In one or more embodiments, access to the base trust component is facilitated through an API call.

The API may be implemented through a dynamic link library (DLL) or through an executable file. A DLL is a shared library that contains code and data that can be used by multiple processes at the same time. In object-oriented programming languages, an API may include a set of class definitions. An instance of a class is referred to as an object and the object is used to call or activate the API. The object may be represented as a data structure consisting of data and methods that implement the API. The data may contain variables that are used by a process to call the API.

A trust activation engine 106 handles the API call and looks for the trust level associated with the API in an API database 114. The API database 114 is secured from tampering by the low privilege application. If the component is associated with a base trust level, the trust activation engine 106 generates an API object using the executable code stored in the API database 114. The base trust object 120 or API object is then forwarded to the user process 108 and stored therein (block 118). The invocation of the API call then proceeds from the isolation execution environment 104.

Figure 2:
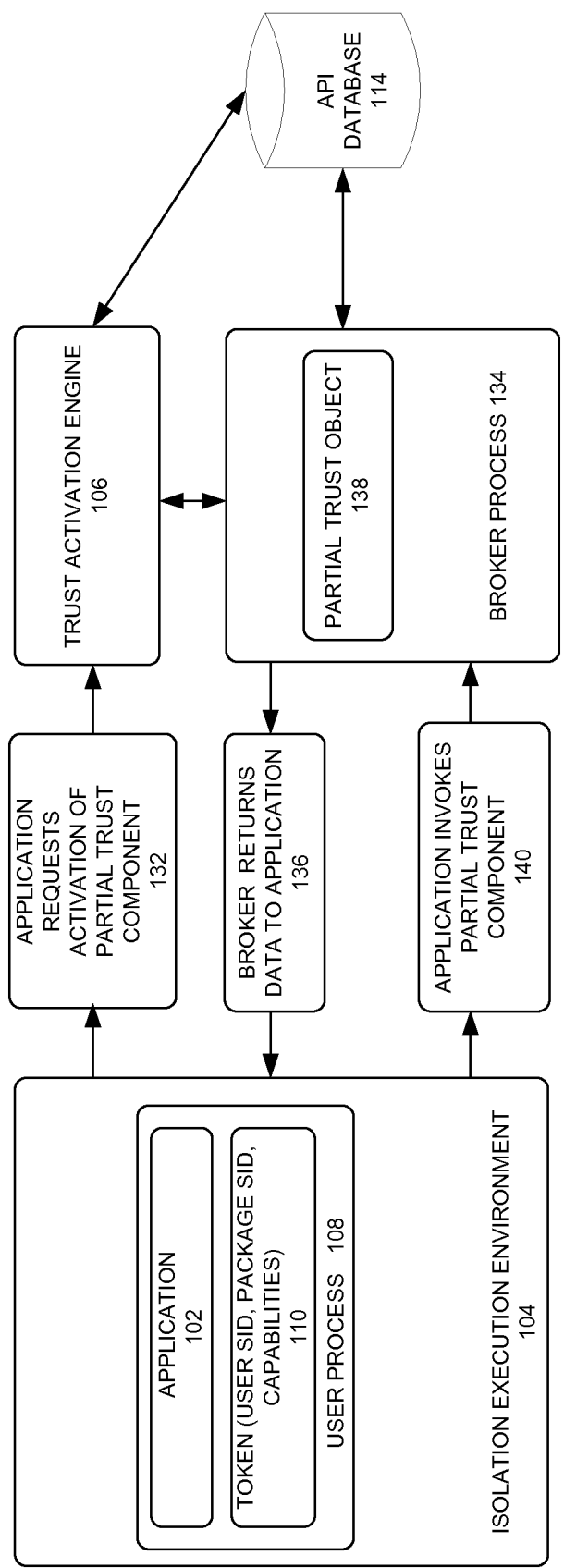
FIG. 2 illustrates a block diagram of a second exemplary system for trust level activation.

FIG. 2 illustrates an exemplary system 130 configured to enable a low-privilege application 102 to access partial trust components within a broker process that is outside of the isolation execution environment 104. The system 130 has an isolation execution environment 104 configured to execute an application 102 in a user process 108. The user process 108 may be associated with a token 110 that identifies the application 102 running in the user process 108 and the permissions or capabilities that the application 102 is permitted to access. The token 110 may include a user secure identifier (SID), a package SID, and the capabilities of the application as noted above.

As noted above, a user process 108 is created for the application 102 and a token 110 is associated with the user process 108. As the application 102 executes, the application 102 may request activation of a partial trust component which is facilitated through an API call (block 132). The trust activation engine 106 handles the API call and looks for the trust level associated with the API from data stored in an API database 114. If the component is associated with a partial trust level, the trust activation engine 106 generates a broker process 134. The broker process 134 generates an API object that is stored in the broker process 134. The broker process 134 forwards data back to the user process 108 (block 136), for the application's use in communicating with the broker process 132 to invoke the API corresponding to the partial trust component (block 140). The broker initiates execution of the API method within the broker process 134.

Figure 3:
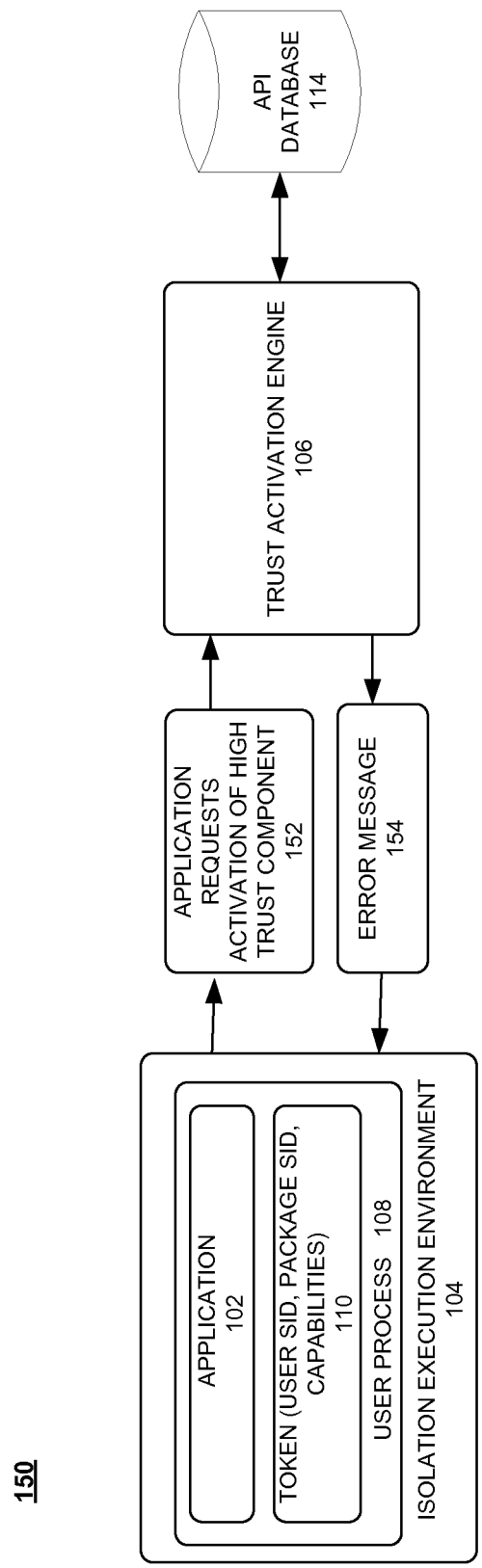
FIG. 3 illustrates a block diagram of a third exemplary system for trust level activation.

FIG. 3 illustrates an exemplary system 150 configured to enable a low-privilege application 102 to directly access a full trust component. The system 150 has an isolation execution environment 104 configured to execute a low privilege application 102 in a user process 108. The user process 108 may be associated with a token 110 that identifies the application 102 running in the user process 108 and the permissions or capabilities that the application 102 is permitted to access. The token 110 may include a user secure identifier (SID), a package SID, and the capabilities of the application as noted above.

The trust activation engine 106 handles requests to activate a full trust component from the application (block 152). The request is made through an API call and the trust activation engine 106 looks for the trust level associated with the API in an API database 114. When the trust activation engine 106 determines that the component is associated with a full trust level, the trust activation engine 106 does not activate the API and instead returns an error message to the application (block 154).

Although the systems shown in FIGS. 1-3 have a limited number of elements in a certain configuration, it should be appreciated that these systems can include more or less elements in alternate configurations for an intended implementation. For example, application code may include other forms of applications such as, without limitation, Windows® Web Applications written in Hyper Text Markup Language (HTML), Cascading Style Sheets (CSS), or JavaScript and Modern Client Applications written in managed code or native code.

In addition, each of the systems shown in FIGS. 1-3 may comprise a computer-implemented system having multiple components, programs, procedures, modules. As used herein these terms are intended to refer to a computer-related entity, comprising either hardware, a combination of hardware and software, or software. For example, an element shown in FIGS. 1-3 may be implemented as a process running on a processor, a hard disk drive, multiple storage drives (of optical and/or magnetic storage medium), an object, an executable, a thread of execution, a program, and/or a computer. One or more elements may reside within a process and/or thread of execution, and an element may be localized on one computer and/or distributed between two or more computers as desired for a given implementation. The embodiments are not limited in this manner.

Attention now turns to a more detailed discussion of operations of the embodiments with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 4:
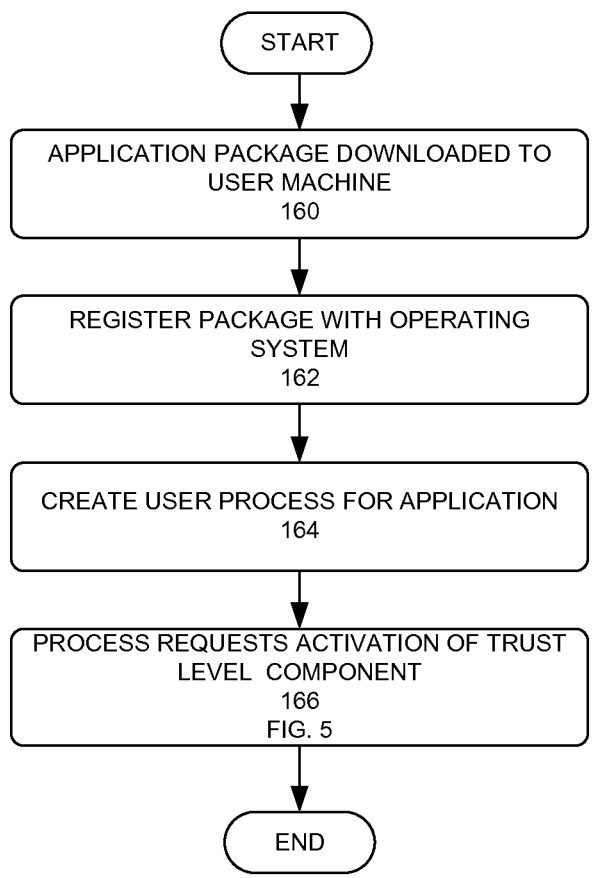
FIG. 4 is a flow chart illustrating a first exemplary method for trust level activation.

FIG. 4 is a flow chart illustrating the trust level activation operations. Initially, an application 102 may be downloaded to a computing device from any source (block 160). In an embodiment, the downloaded application may be in the form of a package that contains application code and a manifest file. The package may be registered with the operating system residing on the computing device (block 162). In an embodiment, a Windows®-based operating system may be employed and the package may be registered with the operating system's registry. Once registered, the operating system may create an isolation execution environment 104 for the application 102 and upon activation of the application 102, generate a user process 108 to execute the application 102 (block 164). For example, the isolation execution environment 104 may be facilitated by a separate software module that sets the application's registry settings to an isolation execution environment 104, allocates a bounded address space for the application, and manages a separate process within which the application executes. During the execution of the application 102, the application 102 may request an operating system runtime component (block 166).

Figure 5:
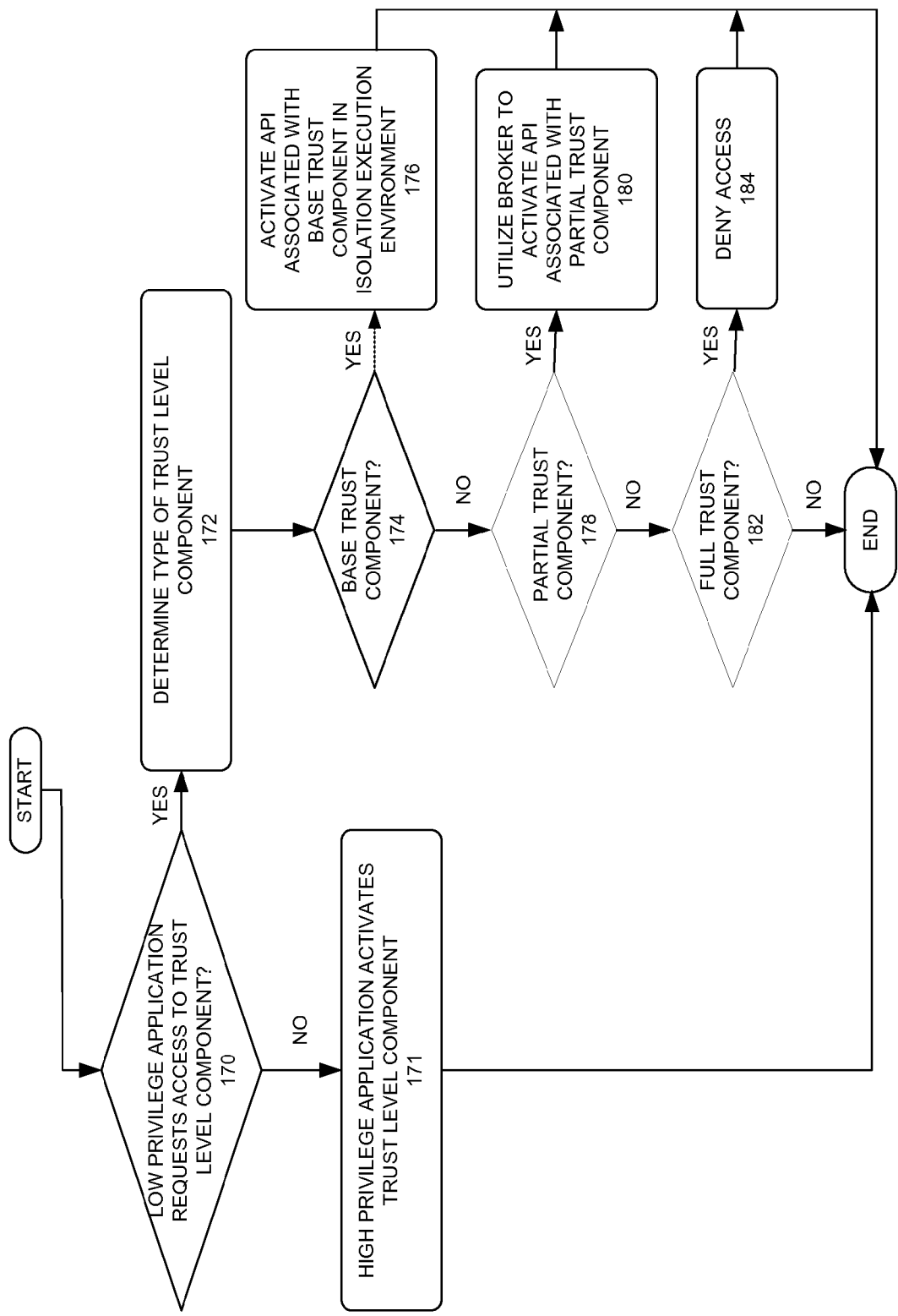
FIG. 5 is a flow chart illustrating a second exemplary method for trust level activation.

Referring to FIG. 5, the process determines the privilege level associated with the application requesting access to a trust level component (block 170). A trust activation engine 106 receives an API call from a user process 108 making the request and determines the identity of the user process 108. The trust activation engine 106 may determine the identity of the user process 108 from the token 110 passed in the API call. If the package SID in the token 110 matches an entry in the operating system registry for processes executing within an isolation execution environment 104, then the trust activation engine 106 determines that the calling application has a low privilege level. Otherwise, the trust activation engine 106 determines that the calling application has a high privilege level.

If a low-privilege application is requesting access to a trust level component (block 170—yes), then the process determines the trust level of the component (block 172). Otherwise (block 170—no), the high level application has access to all trust level components and as such, the high level application is able to invoke the trust level component from its execution environment (block 171).

In the case of a low privilege application, the trust activation engine 106 determines the type of trust level component requested in the API call (block 172). The trust activation engine 106 matches the requested component in an API database 114 which contains the trust level associated with each component. If the requested component is associated with a base trust level (block 174—yes), then the trust activation engine generates an API object (block 176). The API object is then forwarded into the user process's address space in the isolation execution environment 104 (block 176). The execution of the method associated with the API call proceeds from the isolation execution environment 104 (block 176).

Otherwise (block 174—no), if the requested component is associated with a partial trust level (block 178—yes), then a broker process 134 may be generated to execute the API call (block 180). The trust activation engine 106 creates a broker process 134 to activate the partial trust component 138 in the broker process 134 (block 180). The broker process 134 then activates the partial trust component 138 by invoking the API call associated with the partial trust component 138 (block 180). The broker process 134 generates an API object (block 180). Data pertaining to the object may be forwarded to the user's process 108 in the isolation execution environment 104 which may then be used in invoking the API call from the application 102 (block 180). The execution of the method associated with the API call executes in the broker process 134 (block 180).

If the requested component is associated with a full trust level (block 182—yes), then the trust activation engine 106 denies access to the full trust component and returns a failure response to the user's process (block 184). Attention now turns to a description of an operating environment utilizing the embodiments described herein.

Figure 6:
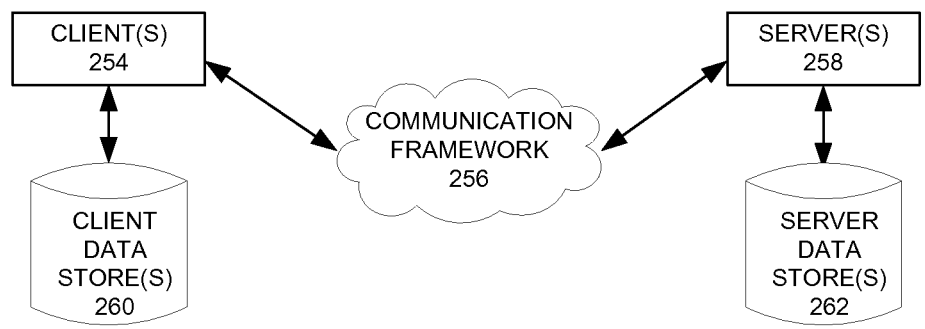
FIG. 6 is a block diagram illustrating an operating environment.

Referring now to FIG. 6, there is shown a schematic block diagram of an exemplary operating environment 250. The operating environment 250 may include one or more client(s) 254 in communication through a communications framework 256 with one or more server(s) 258. In an embodiment, a client 254 may be implemented as the computing device embodying systems 100, 130, and 150. The server 258 may be implemented as the source of the application code that is provided to the client 254 which may be an application store, a server, an email server, a web server, and so forth. Each client(s) 254 is coupled to one or more client data store(s) 260 that store information local to the client 254. Each server(s)

258 is coupled to one or more server data store(s) 262 that store information local to the server 258.

A client 254 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 254 may also be embodied as a software module having instructions that execute in a single execution path, multiple concurrent execution paths (e.g., thread, process, etc.), or in any other manner.

A server 258 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 258 may also be embodied as a software module having instructions that execute in a single execution path, multiple concurrent execution paths (e.g., thread, process, etc.), or in any other manner.

The communications framework 256 facilitates communications between the client 254 and the server 258. In an embodiment, the communications framework 256 may be embodied as a communications network, such as the Internet, a local area network, or a wide area network, or combinations thereof. The communications framework 256 may embody any type of communications medium, such as wired or wireless networks, utilizing any communication protocol.

Figure 7:
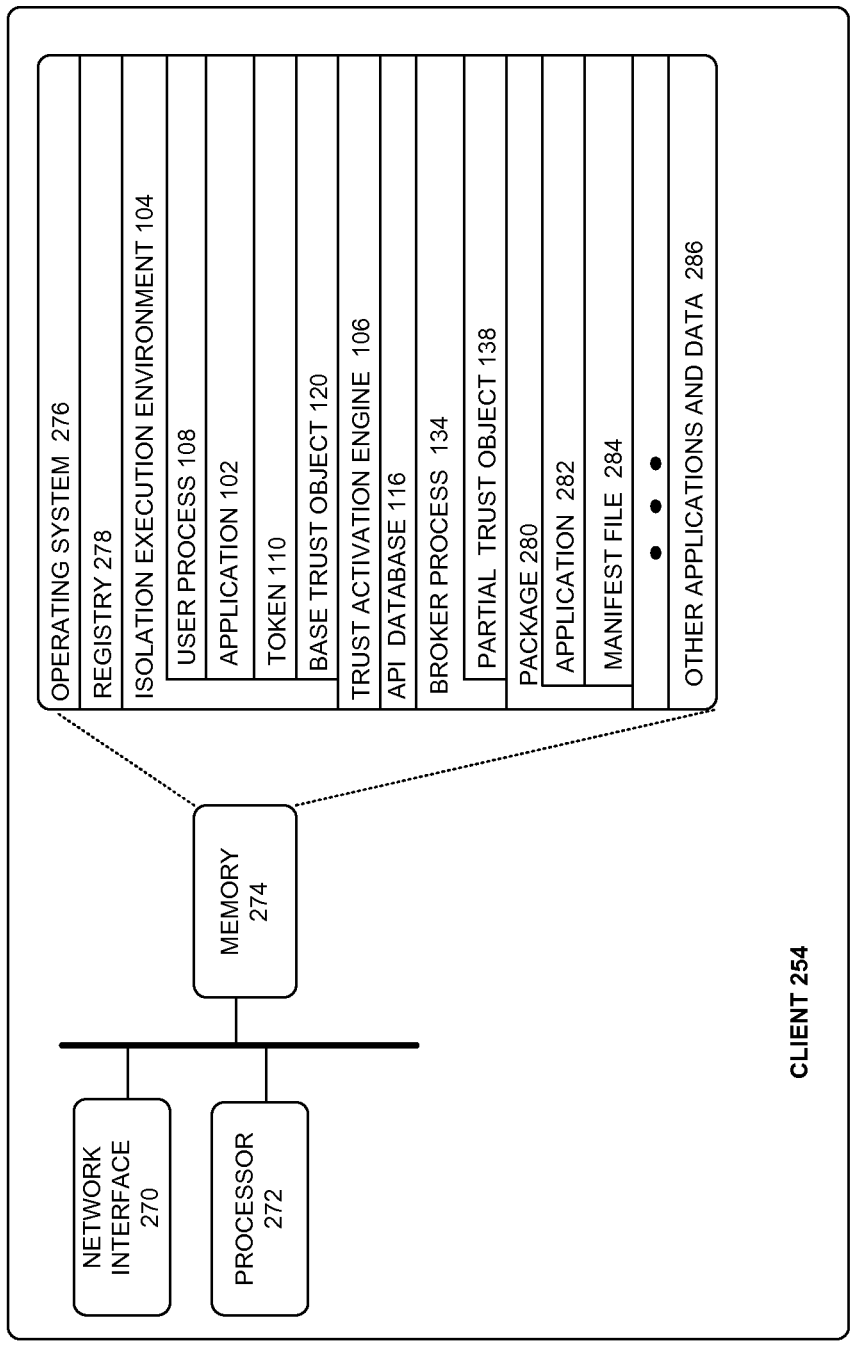
FIG. 7 is a block diagram illustrating exemplary components of a computing device used in an operating environment.

Referring to FIG. 7, the client 254 may have a network interface 270, a processor 272, and a memory 274. The processor 272 may be any commercially available processor and may include dual microprocessors and multi-processor architectures. The network interface 270 facilitates wired or wireless communications between the client 254 and a communications framework 256 in order to provide a communications path between the client 254 and a server 258.

The memory 274 may be any computer-readable storage media or computer-readable media that may store processor-executable instructions, procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 274 may also include one or more external storage devices or remotely located storage devices. The memory 274 may contain instructions and data as follows:

an operating system 276;
a registry 278;
an isolation execution environment 104 having a user process 108, an application 102, a token 110, and a base trust object 120;
a trust activation engine 106;
an API database 114;
a broker process 134 having a partial trust object 138;
a package 280 having an application 282 and a manifest file 284; and
various other applications and data 286.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, various embodiments of the system may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software components, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

What is claimed:

1. A computer-implemented method, comprising:
associating one of a plurality of trust levels with a component, the component including executable instructions that access a resource controlled by an operating system, the trust level associates a security level with the resource;
associating a privilege level with an application, the privilege level associates a security level with the application, the trust level of the component separate from the privilege level of the application;
executing the application in an isolation execution environment when the privilege level of the application is a first level;
requesting, by the application, activation of the component; and
based on the trust level of the component and the privilege level of the application, executing the component requested by the application in a broker process, the broker process accesses the resource in an execution environment that is separate from the isolation execution environment.

2. The computer-implemented method of claim 1, wherein the application is associated with a low privilege level.

3. The computer-implemented method of claim 1, wherein the component requested by the application is associated with a partial trust level.

4. The computer-implemented method of claim 1, further comprising:
executing the component requested by the application in the isolation execution environment when the component requested by the application has a base trust level.

5. The computer-implemented method of claim 1, further comprising:
denying access to the component requested by the application when the requested component has a full trust level.

6. The computer-implemented method of claim 1, further comprising:
generating an API object associated with the component requested by the application when the component requested by the application is associated with a partial trust level; and
activating the API object within the broker process.

7. The computer-implemented method of claim 1, further comprising:
generating an API object associated with the component requested by the application when the component requested by the application is associated with a base trust level; and
activating the API object within the isolation execution environment.

8. A computer-readable storage device storing thereon processor-executable instructions that when executed perform actions, comprising:
creating an isolation execution environment that executes an application, the application associated with a privilege level;
requesting activation of a component by the application, the component including executable instructions used to access a resource controlled by an operating system, the component associated with a trust level, the trust level of the component separate from the privilege level of the application; and
based on the trust level of the component and the privilege level of the application;
creating a broker process to execute the component requested by the application; and
executing the component requested by the application in the broker process, the broker process operates in an execution environment separate from the isolation execution environment.

9. The computer-readable storage device of claim 8, further comprising:
recognizing a plurality of trust levels associated with a component.

10. The computer-readable storage device of claim 8, further comprising:
executing the component requested by the application in the isolation execution environment when the component requested by the application is associated with a base trust level.

11. The computer-readable storage device of claim 8, further comprising:
denying execution of the component requested by the application in the isolation execution environment when the component requested by the application is associated with a full trust level.

12. The computer-readable storage device of claim 8, further comprising:
generating an API object associated with the component requested by the application which is executed in the broker process when the component requested by the application is associated with a partial trust level.

13. The computer-readable storage device of claim 8, further comprising:
generating an API object associated with the component requested by the application which is executed in the isolation execution environment when the component requested by the application is associated with a base trust level.

14. The computer-readable storage device of claim 8, further comprising:
creating an execution environment that executes a high privilege application; and
executing a component requested by the high privilege application in the execution environment.

15. An apparatus, comprising:
a processor; and
a memory, coupled to the processor, the memory having a trust activation module, the trust activation module containing instructions that when executed on the processor determines whether an application, associated with a select privilege level, may access a component having a select trust level, the application executing in an isolation execution environment separate from the trust activation module, the component including executable instructions used to access a resource controlled by an operating system, the trust activation module configures a broker process to execute the component based on the trust level of the component and the privilege level of the application in an execution environment separate from the isolation execution environment, the trust level of the component separate from the privilege level of the application.

16. The apparatus of claim 15, further comprising:
the trust activation module containing instructions that when executed on the processor prohibits a low privilege application from executing the component when the component has a full trust level.

17. The apparatus of claim 15, further comprising:
the trust activation module containing instructions that when executed on the processor enables a high privilege application to execute any trust level component.

18. The apparatus of claim 15, further comprising:
the trust activation module containing instructions that when executed on the processor provides a low privilege application with executable code configured to execute in the isolation execution environment when the component has a base trust level.

19. The apparatus of claim 15, further comprising:
the trust activation module containing instructions that when executed on the processor denies execution of a component requested by the application in the isolation execution environment when the component requested by the application is associated with a full trust level.

20. The apparatus of claim 15, wherein the component is associated with an API object.

* * * * *